(12) United States Patent
Vemuri et al.

(10) Patent No.: US 11,864,050 B2
(45) Date of Patent: Jan. 2, 2024

(54) RADIO ACCESS NETWORK NOTIFICATION AREA SELECTION AND PAGING BASED ON TRAVEL INFORMATION

(71) Applicant: GM GLOBAL TECHNOLOGY OPERATIONS LLC, Detroit, MI (US)

(72) Inventors: Venkata Naga Siva Vikas Vemuri, New Hudson, MI (US); Andrew J. MacDonald, Grosse Pointe Park, MI (US); Charles A. Everhart, Canton, MI (US); Scott Thomas Droste, West Bloomfield, MI (US); Ashhad Mohammed, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 345 days.

(21) Appl. No.: 17/393,580

(22) Filed: Aug. 4, 2021

(65) Prior Publication Data
US 2023/0039800 A1    Feb. 9, 2023

(51) Int. Cl.
| | | |
|---|---|---|
| *H04W 4/00* | (2018.01) | |
| *H04W 36/32* | (2009.01) | |
| *H04W 60/04* | (2009.01) | |
| *H04W 68/00* | (2009.01) | |

(52) U.S. Cl.
CPC ........... *H04W 36/32* (2013.01); *H04W 60/04* (2013.01); *H04W 68/005* (2013.01)

(58) Field of Classification Search
CPC ... H04W 36/32; H04W 60/04; H04W 68/005; H04W 48/20; H04W 76/27; H04W 68/04; H04W 8/08

USPC .......................................................... 370/329
See application file for complete search history.

(56) References Cited

U.S. PATENT DOCUMENTS

| | | | | |
|---|---|---|---|---|
| 8,571,582 | B2 * | 10/2013 | Lopez .................. | H04W 68/04 |
| | | | | 370/312 |
| 8,881,505 | B2 * | 11/2014 | Frazier .................. | B60W 40/12 |
| | | | | 60/285 |
| 9,560,628 | B2 * | 1/2017 | Östrup ................ | H04W 68/005 |
| 10,264,622 | B2 * | 4/2019 | Park ...................... | H04W 68/02 |
| 10,281,928 | B2 * | 5/2019 | Behling .................. | B63B 45/08 |
| 10,484,968 | B2 * | 11/2019 | Abedini .................. | H04W 8/08 |
| 10,531,431 | B2 * | 1/2020 | Ryu ....................... | H04W 72/12 |
| 10,542,515 | B2 * | 1/2020 | Li ........................... | H04W 8/08 |
| 10,728,927 | B2 * | 7/2020 | Chou .................... | H04W 76/27 |
| 10,840,982 | B2 * | 11/2020 | Zhang .................. | H04W 16/28 |

(Continued)

*Primary Examiner* — Amancio Gonzalez
(74) *Attorney, Agent, or Firm* — CANTOR COLBURN LLP (57) ABSTRACT

A system includes a user equipment (UE) traveling at least at a predetermined velocity. The UE is in RRC_INACTIVE state since time T. The system further includes at least a first base station and a second base station. The first base station receives an RRC_INACTIVE state message from the UE. The RRC_INACTIVE state message includes a location and a velocity of the UE, and a time-lapse, which is an elapsed duration since T. In response to a paging message from a core network, the first base station predicts a location of the UE. In response to the UE being within range of the first base station, the first base station sends the paging message to the UE. In response to the UE being within range of the second base station, the first base station sends a request to the second base station to send the paging message to the UE.

20 Claims, 5 Drawing Sheets

(56) References Cited

U.S. PATENT DOCUMENTS

| | | | |
|---|---|---|---|
| 10,863,575 B2* | 12/2020 | Futaki | H04W 36/0016 |
| 10,939,444 B1* | 3/2021 | Bellamkonda | H04W 16/28 |
| 10,959,070 B2* | 3/2021 | Adachi | H04W 72/02 |
| 11,122,540 B2* | 9/2021 | Ke | H04W 76/10 |
| 11,265,696 B2* | 3/2022 | Zou | H04W 36/008375 |
| 11,347,326 B2* | 5/2022 | Chauvin | G06F 3/0383 |
| 11,431,598 B1* | 8/2022 | Pratt | H04L 43/091 |
| 11,451,943 B2* | 9/2022 | Mach | H04W 24/08 |
| 11,533,845 B2* | 12/2022 | Koch | A01D 90/10 |
| 11,694,563 B2* | 7/2023 | Luomi | G05D 1/106 |
| | | | 701/120 |
| 11,751,165 B2* | 9/2023 | Wei | H04W 16/28 |
| | | | 455/427 |
| 2015/0215830 A1* | 7/2015 | Dalsgaard | H04W 36/0088 |
| | | | 455/444 |
| 2018/0174446 A1* | 6/2018 | Wang | G08G 1/096716 |
| 2019/0150226 A1* | 5/2019 | Koshimizu | H04W 88/184 |
| | | | 370/329 |
| 2019/0281644 A1* | 9/2019 | Hu | H04B 7/15528 |
| 2020/0196375 A1* | 6/2020 | Ryu | H04W 76/34 |
| 2021/0014664 A1* | 1/2021 | Wu | H04W 8/08 |
| 2021/0345295 A1* | 11/2021 | Park | H04W 68/025 |
| 2022/0022159 A1* | 1/2022 | Johansson | H04W 36/08 |
| 2022/0120842 A1* | 4/2022 | Edge | H04W 76/19 |
| 2022/0124781 A1* | 4/2022 | Meylan | H04W 72/23 |
| 2022/0338077 A1* | 10/2022 | Kim | H04W 76/27 |
| 2023/0100843 A1* | 3/2023 | Schliwa-Bertling | H04W 68/00 |
| | | | 370/329 |
| 2023/0228834 A1* | 7/2023 | Gummadi | G01S 5/145 |
| | | | 342/458 |

* cited by examiner

RADIO ACCESS NETWORK NOTIFICATION AREA SELECTION AND PAGING BASED ON TRAVEL INFORMATION

INTRODUCTION

The present disclosure relates to telecommunication technology, and particularly systems, storage media, and methods for radio access network (RAN) notification area (RNA) selection and paging based on vehicular information.

Wireless communication systems are widely deployed to provide telecommunication services such as telephony, media, navigation, messaging, broadcasts, etc. Examples of wireless communication systems include division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. The wireless communication systems can adopt various telecommunication standards to provide a common protocol that enables different wireless devices to communicate on a municipal, national, regional, and even global level. An example telecommunication standard is 5G New Radio (NR). While the wireless communication systems facilitate communication between user equipment (UE) and a base station via a radio access network (RAN), improvements are needed, particularly when the UE is in a state of motion.

SUMMARY

According to one or more examples, a system includes a user equipment (UE) that is traveling at least at a predetermined velocity, wherein the UE is in RRC_INACTIVE state since time T. The system further includes multiple base stations, including at least a first base station and a second base station. The first base station receives an RRC_INACTIVE state message from the UE, wherein the RRC_INACTIVE state message comprises a location of the UE, a velocity of the UE, and a time-lapse, which is an elapsed duration since T. In response to a paging message from a core network, the first base station predicts a location of the UE. In response to the UE being within range of the first base station, the first base station sends the paging message to the UE. In response to the UE being within range of the second base station, the first base station sends a request to the second base station to send the paging message to the UE.

In one or more example, in response to the first base station receiving a message from the UE within a predetermined duration from sending the paging message, the first base station stores updated information of the UE based on the location, the velocity, and the time-lapse from the UE.

In one or more example, the first base station stores the location, the velocity, and the time-lapse from the UE until the UE changes state from the RRC_INACTIVE state.

In one or more example, the first base station further predicts a route of the UE based on a plurality of RRC_INACTIVE state messages from the UE. The first base station determines a list of base stations along the route that is predicted. Further, the first base station sends at least a subset of the list of base stations to the UE.

In one or more example, in response to the first base station not receiving the message from the UE within the predetermined duration from sending the paging message, the first base station predicts a route of the UE based on a plurality of RRC_INACTIVE state messages from the UE. The first base station further determines a list of base stations along the route that is predicted. The first base station further sends, to each base station from the list of base stations, the request to send the paging message to the UE.

In one or more example, the first base station sends the request to each base station from the list of base stations sequentially.

In one or more example, the first base station sends the request to each base station from the list of base stations concurrently.

According to one or more examples, a method includes receiving, by a first base station from a plurality of base stations in a wireless communication network, an RRC_INACTIVE state message from a user equipment (UE) that is traveling at least at a predetermined velocity, wherein the UE is in RRC_INACTIVE state since time T, and wherein the RRC_INACTIVE state message comprises a location of the UE, a velocity of the UE, and a time-lapse, which is an elapsed duration since T. The method further includes, in response to receiving, by the first base station, a paging message from a core network, predicting, by the first base station, a location of the UE. Further, in response to the UE being within range of the first base station, the first base station sends the paging message to the UE. Further, in response to the UE being within range of a second base station from the plurality of base stations, the first base station sends a request to the second base station to send the paging message to the UE.

In one or more example, in response to the first base station receiving a message from the UE within a predetermined duration from sending the paging message, the first base station stores updated information of the UE based on the location, the velocity, and the time-lapse from the UE.

In one or more example, the first base station stores the location, the velocity, and the time-lapse from the UE until the UE changes state from the RRC_INACTIVE state.

In one or more example, the first base station further predicts a route of the UE based on a plurality of RRC_INACTIVE state messages from the UE. The first base station further determines a list of base stations along the route that is predicted. The first base station further sends at least a subset of the list of base stations to the UE.

In one or more example, in response to the first base station not receiving the message from the UE within the predetermined duration from sending the paging message, the first base station predicts a route of the UE based on a plurality of RRC_INACTIVE state messages from the UE. The first base station further determines a list of base stations along the route that is predicted. The first base station further sends, to each base station from the list of base stations, the request to send the paging message to the UE.

In one or more example, the first base station sends the request to each base station from the list of base stations sequentially.

In one or more example, the first base station sends the request to each base station from the list of base stations concurrently.

According to one or more embodiments, a vehicle includes a user equipment (UE) that is traveling at least at a predetermined velocity, wherein the UE is in RRC_INACTIVE state since time T. The UE sends, to a first base station from a plurality of base stations, an RRC_INACTIVE state message, wherein the RRC_INACTIVE state message comprises a location of the UE, a velocity of the UE, and a time-lapse, which is an elapsed duration since T. The UE also receives, from the first base station, a list of base stations, wherein the first base station predicts a route of the UE based on a plurality of RRC_INACTIVE state messages from the UE, and determines the list of base stations along the route that is predicted.

In one or more example, the UE is embedded in a vehicle controller of the vehicle.

In one or more example, the UE is an independent device from the vehicle, and wherein the UE is being used inside the vehicle.

In one or more example, the UE sends, to the first base station, an updated location or an updated velocity in response to a detected change.

In one or more example, the UE sends, to the first base station, a route and velocity information matrix that comprises a plurality of entries, each entry comprising the location of the UE, the velocity of the UE, and the time-lapse since T.

In one or more example, at time T+X seconds, the UE sends the RRC_INACTIVE state message to a second base station based on the list of base stations indicating that the UE will be in range of the second base station at the time T+X seconds.

The above features and advantages and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings.

DETAILED DESCRIPTION

The following description is merely exemplary in nature and is not intended to limit the present disclosure, its application, or its uses. It should be understood that throughout the drawings, corresponding reference numerals indicate like or corresponding parts and features. As used herein, the term module refers to processing circuitry that may include an application-specific integrated circuit (ASIC), an electronic circuit, a processor (shared, dedicated, or group) and memory that executes one or more software or firmware programs, a combinational logic circuit, and/or other suitable components that provide the described functionality.

As used herein, the term "wireless communication" refers to electronic communication using any suitable wireless communication standards, such as NR, LTE-Advanced (LTE-A), LTE, Wideband Code Division Multiple Access (WCDMA), High-Speed Packet Access (HSPA), CDMA2000, and so on. Furthermore, the communication between network devices and between a network device and a terminal device in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, the NR communication protocols, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as an NR BS or a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that can access a wireless communication network and receive services therefrom. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smartphone, a tablet, a wearable device, a personal digital assistant (PDA), portable computers, image-capture terminal devices such as digital cameras, gaming terminal devices, music storage, and playback appliances, wearable terminal devices, vehicle-mounted wireless terminal devices, vehicle controllers with wireless communication capabilities, and the like. The following description may use the terms "terminal device," "terminal," "user equipment," and "UE" interchangeably.

Figure 1:
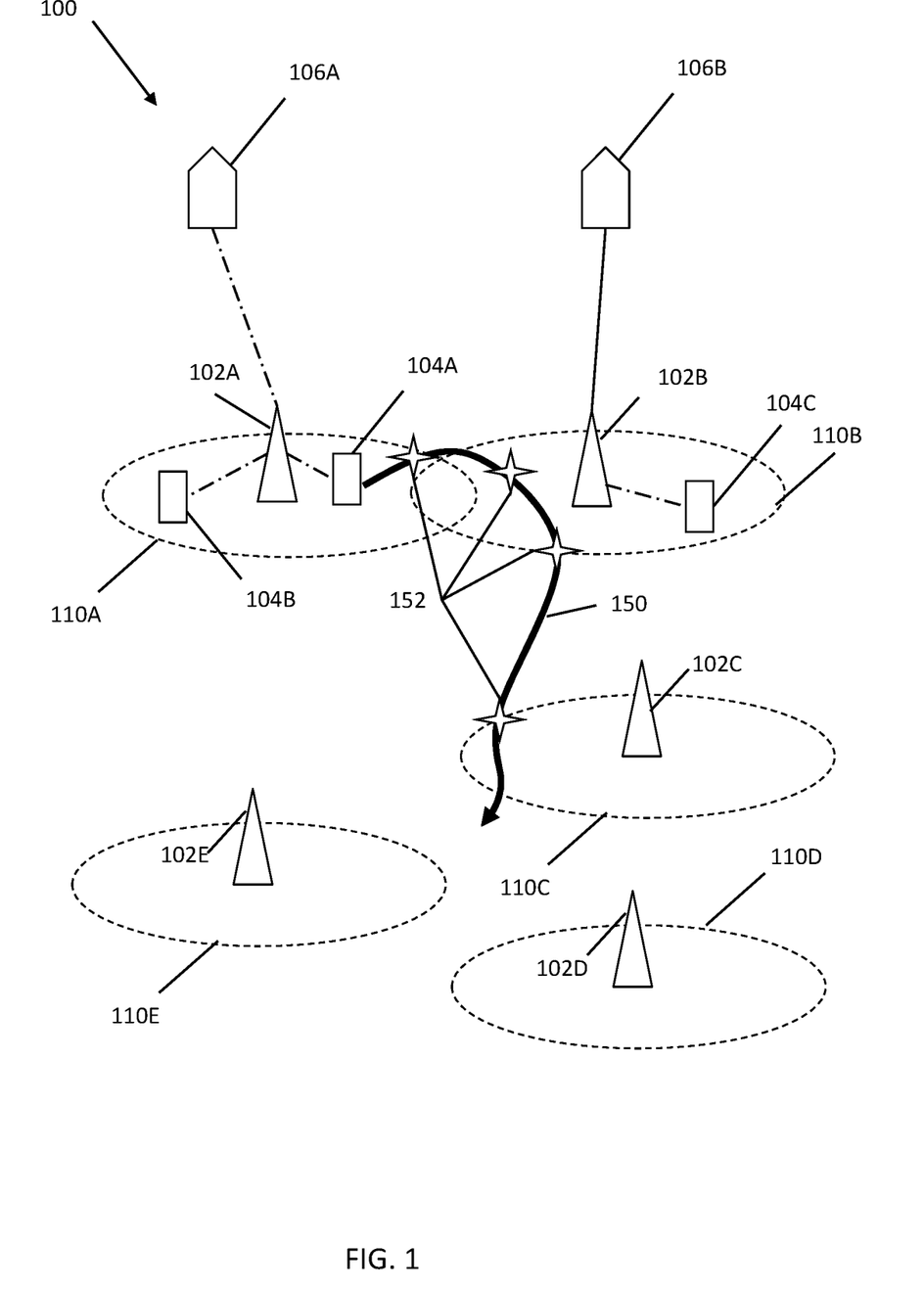
FIG. 1 illustrates an example wireless communication network according to one or more examples.

FIG. 1 illustrates an example wireless communication network 100 according to one or more examples. The wireless communication network 100 may include one or more network devices, for example, network devices 102 (A-E), which may be an eNB or gNB. It will be appreciated that the network devices 102 can also be in the form of a Node B, Base Transceiver Station (BTS), and/or Base Station Subsystem (BSS), AP and the like, or any other type of network device. Henceforth, the network devices 102 are referred to as "base stations" 102. The base station 102A provides radio connectivity to a set of terminal devices (for example, UEs 104A, 104B)) within an RNA 110, while the base station 102B provides radio connectivity to another set of terminal devices, for example, UE 104C which is in another RNA 110B. It is understood that the number of UEs in each RNA can be different than what is depicted in FIG. 1.

Here, an "RNA" represents a Radio Access Network (RAN) based notification area (i.e., a geographic area that can be serviced by a base station that is allocated to that geographic area). For example, in FIG. 1, base station 102A is allocated to service the RNA 110A, base station 102B to the RNA 110B, base station 102C services RNA 110C, base station 102D services RNA 110D, and base station 102E services RNA 110E. It is understood that the wireless communication network 100, in other examples, can have an additional or different number of base stations and/or RNAs. Two or more RNAs (e.g., 110A, 110B) can overlap in some examples. Each RNA 110 may have certain characteristics, such as being an LTE or an NR cell and many other specific characteristics. In the present disclosure, the term "RNA" may be used as a proxy for the corresponding base station that provides the radio connectivity within that RNA. In such cases, the "RNA" is characterized to provide certain functionality. However, it is understood that the base station or node provides that functionality in the RNA coverage area. It may be convenient to describe the RNA to provide these characteristics and other functionality. However, the arrangements and specifics of the base station (and other network devices) determine the function and characteristics of a particular RNA.

As shown in FIG. 1, one or more base stations 102 can connect to a core network (CN) 106A, 106B, respectively. For example, the base station 102A may be a 5G gNB connected to a 5G CN 106A, and the base station 102B may be an LTE eNB connected to a 4G evolved packet core (EPC) 106B. It should be noted that the other base stations (102C-E) in FIG. 1 may be connected to corresponding CNs, which are not shown. In some examples, per 3GPP standards, the base station 102B may also connect to the 5G CN 106A. In some examples, one or more of the base stations 102 may connect to the same CN (e.g., CN 106A).

It is understood that the wireless communication network 100 that is depicted in FIG. 1 can include various other components that are not shown, such as access points, Wi-Fi stations (STAs), gateways, etc. Also, it is understood that there can be an additional/different number of base stations 102, UEs 104, and RNAs 110 than those shown.

The base stations 102 wirelessly communicate with the UEs 104. The communication links between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104.

According to the 3rd Generation Partnership Project (3GPP) standards for wireless communication networks, the RRC_INACTIVE state is a radio resource control (RRC) state used during the communication between base stations 102 and the UEs 104. RRC_INACTIVE state aims to achieve power saving with acceptable access latency and is suitable especially for small data transmission such as machine type communications (MTC) scenarios. For example, consider the case where the UE 104A is traveling along route 150. Further, consider that the UE 104A is presently in RNA 110A and (consequently) in communication with the base station 102A. Route 150 can cause the UE 104A to travel from RNA 110A into RNA 110B, RNA 110C, and so on. Route 150 is a predicted route of the UE 104A in one or more examples.

When the UE 110A is in RRC_INACTIVE state, the base station 102A (i.e., the next generation RAN and/or non-3GPP access network) and the UE 104A store the Access Stratum (AS) context (e.g., UE context) separately. In addition, when the UE 104A is in RRC_INACTIVE state, the UE 104A does not have an RRC connection with the base station 102A, although the base station 102A keeps a connection with the core network 106A (e.g., 5G Core Network (5GC)). Characteristics of the RRC_INACTIVE state further require the base station 102A to trigger paging of UEs 104. As a whole, the UE 104A in RRC_INACTIVE state (e.g., an RRC_INACTIVE UE) may incur minimum signaling, minimum power consumption, and minimum resource costs in the core network 106A and/or the radio access network (e.g., 5G-AN).

The RNA allows the base station 102A to know an estimated location of an RRC_INACTIVE UE (e.g., 104A). The RNA may include one or more RAN areas, one or more tracking areas, or any combination thereof. The RNA is UE-specific and configurable by the base stations 102 (e.g., by NG-RAN having one or more next-generation node Bs (gNBs) and/or one or more next-generation evolved node Bs (ng-eNBs)) using dedicated signaling. It is a technical challenge for the next generation radio access network (e.g., 5G RAN, 5G-AN) to be aware of the RRC_INACTIVE UE (e.g., 104A) moving from one RNA to another and update the RRC_INACTIVE UE's RNA.

When the UE 104A is in RRC_INACTIVE state, the base station 102A is aware of the UE's 104A location within the RNA 110A, and the UE 104A can move within that RNA 110A without notifying the base station 102A. However, without the proper mobility management, when an RRC_INACTIVE UE 104A is moving out of the coverage of its anchor gNB (e.g., UE 104A moves from the RNA 110A to the RNA 110B), the UE context is not transferred accordingly. Moreover, without the proper mobility management, when the UE 104A moves out of the RNA 110A of its anchor gNB (i.e., base station 102A), the anchor gNB cannot find the RRC_INACTIVE UE 104A. As a result, the RRC_INACTIVE UE 104A cannot quickly reestablish or resume an RRC connection to a target gNB (i.e., base station 102B if the UE 104A moves into RNA 110B). This is because the target gNB is out of the starting RNA (i.e., RNA 110A) of the anchor gNB (base station 102A), and does not have the UE context or a connection to the target gNB (base station 102B). In addition, if the UE 104A is moving at speed higher than a predetermined threshold (e.g., 5 miles per hour, 25 miles per hour, etc.) or the RNA 110A is smaller than a predetermined threshold (e.g., 50-mile radius, 20-mile radius, etc.), the UE context transfer and RNA update become more frequent, causing more overhead. Furthermore, incurring frequent UE context transfer from one gNB to another in the same RNA, which does not need the UE 104A to contest for DL/UL data transmission, can also cause extra overhead.

The technical solutions described herein address such technical challenges with wireless communication networks by using information about a UE 104 to estimate the movement of the UE 104 from one RNA 110 to another and page the base station(s) 102 (e.g., of the RNAs identified based on predicted route points 152 (RP1, RP2, etc.)) and velocity vector information of the moving UE 104. In one or more examples, parallel paging may be used by the anchor base station to alert the predicted RNAs on the moving UE's route. Alternatively, or in addition, in some examples, the anchor base station uses sequential paging to alert the predicted RNAs. In one or more examples, the technical solutions described herein can also facilitate locating the UE based on time-lapse data and other information associated with the UE.

The technical solutions described herein provide an improved wireless communication network. Further, the technical solutions described herein improve the operation of one or more network devices, such as the base stations, the UEs, etc. The technical solutions described herein provide a practical solution to improve the efficiency of the UEs, base stations, and the overall wireless communication network.

Existing technical solutions use expected UE activity behavior, handover information, trajectory, and other such parameters based on the recent activity of the UE in question. Such projection based on recent history is not accurate in several cases, particularly when the UE has a velocity above a certain threshold (e.g., 5 miles per hour) with varied trajectories and direction (e.g., UE associated with the vehicle, vehicle itself, etc.). Table 1 indicates some of the information captured to predict a UE activity in existing technical solutions.

TABLE 1

| Information Element (IE)/ Group Name | Presence | Range | IE type | Description |
|---|---|---|---|---|
| Expected UE activity behavior | O | 180 secs | Integer | |
| Expected Handover interval | O | | Enumerated (Sec 15, sec 30 . . . ) | Indicates expected time interval btw inter base station handover |
| Expected UE Mobility | O | | (Stationary, Mobile) | Indicates whether UE is expected to be stationary or mobile |
| Expected UE trajectory | | 0 . . . 1 | | UE expected geographical movement |
| Expected UE Moving Trajectory item | | <Max no of Cells UE moving Trajectory> Max value is 16 | | Include visited and non-visited cells, most recent will be listed first |
| Base station CGI | M | | | |
| Time stayed in Cell | O | | (0 . . . 4095 secs) | Included for visited cells and indicates time a UE stayed in a cell in secs. IE is set to 4095 |

The technical solutions described herein include a route and velocity information matrix (e.g., Table 2) that assists the base stations 102 to allocate RNAs to a UE 104 accurately. Further, in some examples, the technical solutions described herein facilitate smart paging, which is based on a "time-lapse" parameter of a UE 104, where the "time-lapse" indicates a duration since the most recent RRC_INACTIVE state was reported to a base station 102 (e.g., 102A). If a message from core network 106 arrives at T+N seconds, the base station 102, based on the time-lapse and velocity vector, can accurately predict the present RNA 110 of the UE (e.g., 104A) and send page requests to the appropriate base station(s) 102.

Referring again to the example of the UE 104A predicted to travel along route 150, consider that the UE 104A is associated with a vehicle (e.g., automobile). For example, the UE 104A may be a communication device embedded in the vehicle, or with a personal communication device inside the vehicle. The UE 104A, accordingly, moves relatively faster than a typical UE. For example, a typical UE may be a communication device that a person may be using (e.g., at the office, at home, etc.), or an IoT device that is being used inside a facility (e.g., warehouse, factory, etc.), or any other such typical UEs. Further, because the UE 104A is associated with a vehicle, route 150 of the UE 104A can be predicted (e.g., based on global positioning system associated with the vehicle 104A, vehicle trajectory of the vehicle, historical travel of the vehicle, etc.).

In such cases, the RRC_INACTIVE state message of the UE 104A contains information such as but not limited to, route location points of the UE 104A (e.g., latitude/longitude coordinates table along the route 150), a velocity vector of the UE 104A (e.g., from a navigation system indicating VelEast, VelNorth, VelUp, etc.), and projected stops and duration/timer (e.g., using existing 3GPP periodic RNA Update timer value (t380)), etc. In one or more examples, unexpected changes in route 150 are updated and indicated to base station 102 corresponding to the present RNA 110 of the UE 104A.

TABLE 2

| Route points (Latitude-Longitude per minute) | Projected Velocity Vector (Magnitude, Direction) | Time-lapse (Since RRC_INACTIVE start) |
|---|---|---|
| Route point A | 26.82 m/s North | T + 60 s |
| B | 26.82 m/s North | T + 120 s |
| C | 29 m/s North East | T + 165 s |
| D | . . . | . . . |
| E | 25 m/s North East | T + 290 s |
| F | 0 m/s North East | T + 350 s |
| G | 29 m/s East | T + 505 s |

(m/s = meters per second.)

Table 2 provides an example of the velocity vector and time-lapse record stored by the base station 102 and/or UE 104A. It is understood that Table 2 provides one example of storing such information and that in other examples, the information may be stored using another format. At each route point 152, a velocity and a direction (i.e., heading) of the UE 104A is recorded. The velocity and heading provide a projected velocity vector. In other examples, the velocity vector can be recorded using different parameters (e.g., magnitude and angle). The recorded "time-lapse" indicates a duration since the latest RRC_INACTIVE state was reported to a base station 102 (e.g., 102A). In some examples, the route points are stored after an RRC_INACTIVE state message is sent to the base station 102 (e.g., 102A), and at least a predetermined duration (e.g., 1 minute, 30 seconds, 90 seconds, etc.) has elapsed. The time-lapse that is recorded indicates the duration since the US 104A entered the RRC_INACTIVE state. In some cases, the time-lapse information is used for periodic and non-periodic RNA updates timer.

It should be noted that the RRC_INACTIVE state message includes additional information, such as the information specified by the 3GPP standard. For example, the RRC_INACTIVE state message can include identifying information (e.g., Internet Protocol (IP) address, Media Access Control (MAC) address) of the UE 104A, which sends the message. The identifying information can be used to communicate with the UE 104A. Further, the RRC_INACTIVE state message can include information to secure the message (e.g., encryption information), validate the message (e.g., checksum/hash information), etc.

Figure 2:
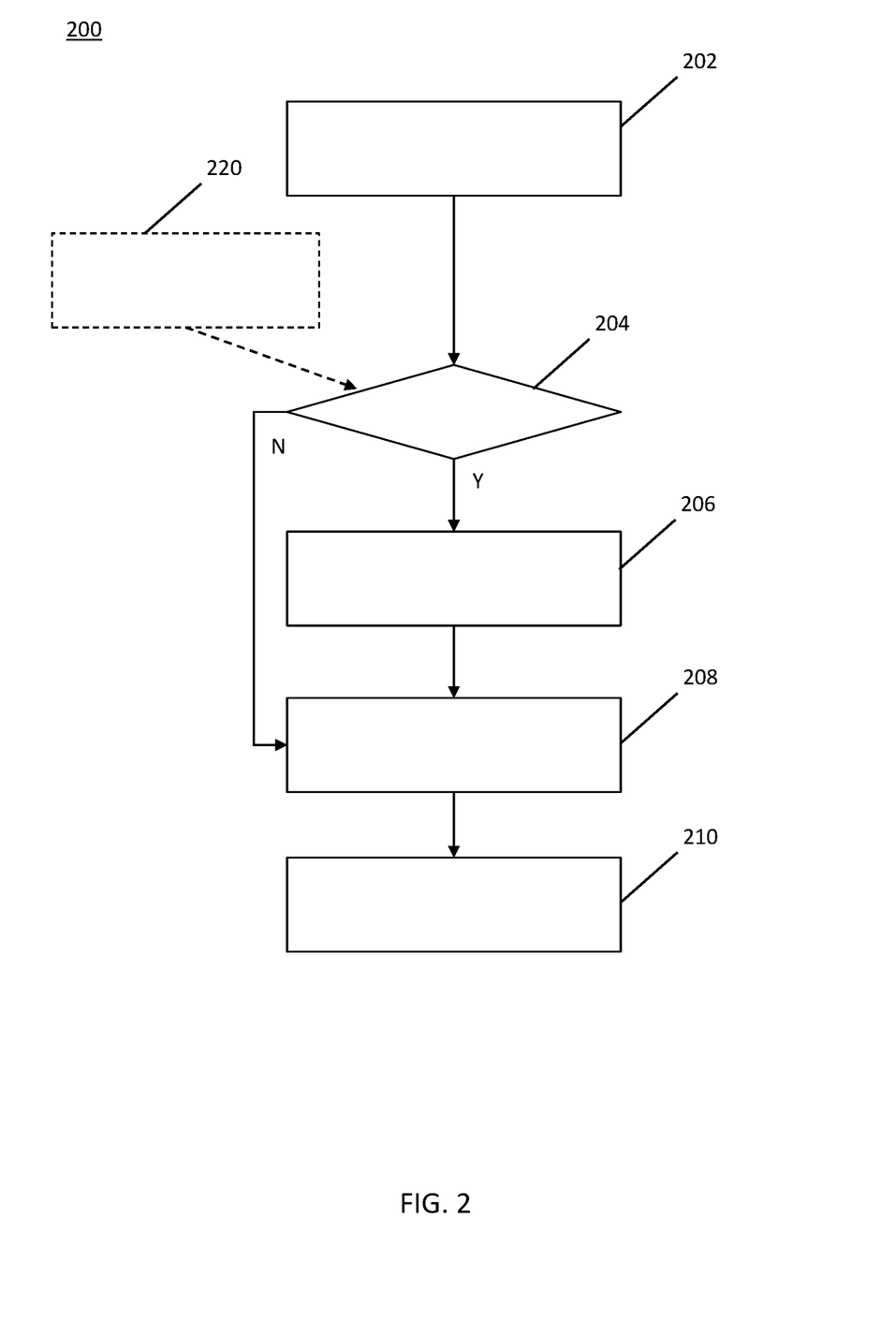
FIG. 2 depicts a flowchart of a method for radio access network (RAN) based notification area (RNA) selection according to one or more examples.

FIG. 2 depicts a flowchart of a method for RNA selection according to one or more examples. The method 200 that is depicted in FIG. 2 can be implemented by a base station, such as the base station 102A, for a particular UE, such as the UE 104A. At block 202, the base station 102A checks for UE mobility condition of the UE 104A. The mobility condition can be checked based on a velocity vector of the UE 104A. The velocity vector is part of the route and velocity information matrix (Table 2). In some examples, the UE 104A periodically sends the route and velocity information matrix to the base station 102A (when the UE 104A is in RNA 110A). The route and velocity information matrix is updated by the UE 104A in the case that route 150 changes, at block 220.

For example, if an operator of the UE 104A changes a destination in a navigation application on the UE 104A, route 150 can change. Alternatively, or in addition, if the UE 104A changes velocity, for example, stops, slows down, accelerates, etc., the RRC_INACTIVE state message is appended with an updated route and velocity information matrix that indicates the updated velocity vector. In some examples, only an updated version of the route and velocity information matrix is sent as part of the RRC_INACTIVE state message to the base station 102.

The base station 102A, based on the route and velocity information matrix in the RRC_INACTIVE state message received, determines one or more conditions of mobility of the UE 104A, at block 204. The conditions of mobility of the UE 104A can include detecting whether the UE 104A is moving at least at a predetermined velocity (e.g., 5 miles per hour, 10 miles per hour, etc.). If the UE 104A is determined not to satisfy mobility conditions (e.g., moving slower than the predetermined velocity), the base station 102A sends a list of RNAs 110 to the UE 104A, at block 208. The list of RNAs 110 typically is a predetermined list of RNAs 110 (e.g., X number of adjacent RNAs).

Alternatively, suppose the conditions of mobility of the UE 104A are satisfied (e.g., the UE 104A is moving at least at the predetermined velocity). In that case, the base station 102A selects the list of RNAs 110 to be sent to the UE based on the route 150, particularly predicted route points of the UE 104A along the route 150, at block 206. For example, based on the list of route points 152 in the route and velocity information matrix, the base station 102A predicts a predetermined number of route points 152. Predicting the route points 152 can be performed using one or more techniques, such as using artificial intelligence, Hidden Markov Models, trajectory mining, or any other techniques or a combination thereof. For example, the base station 102A can continuously perform route pattern mining on the route and velocity information matrix to predict route 150 of the UE 104A. Alternatively, or in addition, route points 152 along route 150 can be predicted based on prior knowledge that is indicative of a destination of the UE 104A. For example, an operator may input the destination address, which can be used to determine route 150.

Based on such future part of route 150 (i.e., the predicted route points), the base station 102A determines a list of RNAs 110 that the UE 104A will encounter. For example, in FIG. 1, the base station 102A may predict that the UE 104A will encounter RNA 110B, RNA 110C, and RNA 110E over the next T minutes, where T is a predetermined duration. Alternatively, or in addition, the base station 102A limits the list of predicted RNAs 110 based on a predetermined number of RNAs to predict, for example, the next three RNAs, the next seven RNAs, etc.

The base station 102A then sends, to the UE 104A, the list of RNAs 110 selected in this manner, at block 208. Table 3 provides an example list of RNAs 110 that is sent to the UE 104A. In an example, in Table 3, the first column indicates a list of RNAs 110 within a certain distance from the base station 102A; and the second column indicates a predicted time at which the base station 102A predicts the UE 104A to be in each respective RNA 110. The predicted time can be expressed as duration since the base station 102A has received the latest RRC_INACTIVE state message from the UE 104A. For example, in Table 3, the predicted time is populated using a 60-second interval assuming the UE 104A travels at 60 miles per hour. However, in other examples, based on mobility and conditions, the time can be populated using T+5 seconds, T+10 seconds, and where T is when the latest RRC_INACTIVE state message is received the UE 104A, and 5, 10 are other examples of intervals.

In some examples, the base station 102A selects a subset of RNAs 110 from Table 3 and sends a list of the selected RNAs 110 to the UE 104A (block 208). In some examples, the base station 102A sends the entire list (i.e., Table 3) to the UE 104A. It is understood that Table 3 provides one example of recording a list of RNAs 110 and that in other examples, the list of RNAs 110 can be stored using any other format. Further, the list of RNAs 110 includes identifying information of each RNA 110 and/or the base stations 102 that are corresponding to the RNAs 110, wherein the identifying information can be used to send/receive communication to/from by the UE 104A.

Further, it is also understood that although Table 3 lists the predicted time in the form of time-lapse, in other examples, the predicted times (from the second column) can be listed in any other manner.

TABLE 3

| RNA List table (With direction) | Time-lapse (Since RRC_INACTIVE Start) |
|---|---|
| RNA A North | T |
| RNA C North | T + 60 s |
| RNA D North East | T + 120 s |
| RNA H East | . . . |
| . . . | |
| RNA H East | T + N times (60) secs |

In some examples, at block 210, the UE 104A continuously sends, as per the 3GPP standard, to the base station 102A, the RRC_INACTIVE state message. The message includes the route and velocity information, along with the time-lapse. The base station 102A stores the received information in the form of the route and velocity information matrix (Table 2) in some examples. Alternatively, or in addition, the UE 104A sends the route and velocity matrix in each RRC_INACTIVE state message. Method 200 is continuously run by the base station 102A for the UE 104A, at least until the UE 104A is in the RNA 110A that is serviced by the base station 102A. Alternatively, or in addition, the UE 104A sends the RRC_INACTIVE state message to the base station 102A until the UE 104A changes its state from the RRC_INACTIVE to any other state (e.g., IDLE, CONNECTED, REL-13 SUSPENDED, or any other state) as may be defined in the 3GPP standard or any other standard in the future.

In some examples, once the UE 104A has the list of RNAs 110, the UE 104A can use the list to send the RRC_INACTIVE state messages to a second base station(s) (e.g., 102B) from the list (instead of the first base station 102A). The base station 102A configures the UE 104A with the other base station (e.g., 102B) as a recipient of the RRC_INACTIVE state message(s) from that UE 104A. In other words, the RRC_INACTIVE state message is sent by the UE 104A to its last serving base station 102A. Upon receipt of the message, the base station 102A can configure the UE 104A with a UE-specific RNA list based on the predicted route 150. For example, at time T+X seconds, the UE 104A sends the RRC_INACTIVE state message to a second base station (e.g., 102B) based on the list of base stations indicating that the UE 104A will be in the range of the second base station at the time T+X seconds.

As noted earlier, in the RRC_INACTIVE state, air interface resources are released, but the UE 104A's context remains on the last serving base station 102A. As per the 3GPP protocol, if the base station 102A receives downlink data (e.g., user plane function (UPF)), or management signaling (e.g., access and mobility management function (AMF)) from the core network 106 or any other component, the base station 102A pages the UE 104A via the neighboring base stations 102. In one or more examples, base station 102A sends a request for paging the UE 104A to the neighboring base stations 102. The base station 102A can send the paging to the UE 104A and/or the paging requests to the neighboring base stations 102 using the Xn interface or any other interface.

In some examples, the paging is initiated by the core network 106, for example, for AMF. The AMF initiates the paging procedure by sending a PAGING message (based on the 3GPP standard) to the base station 102A (i.e., NG-RAN node). As per the 3GPP standard, at the reception of the PAGING message, the base station 102A performs paging of the UE 104A (and other UEs in RNAs which belong to tracking areas of the base station 102A).

The technical solutions described herein improve the operation of transmitting paging requests by predicting the location of the UE 104A based on the route and velocity information matrix and forwarding the paging requests to the appropriate base stations 102 that may be associated with the traveling UE 104A.

Figure 3:
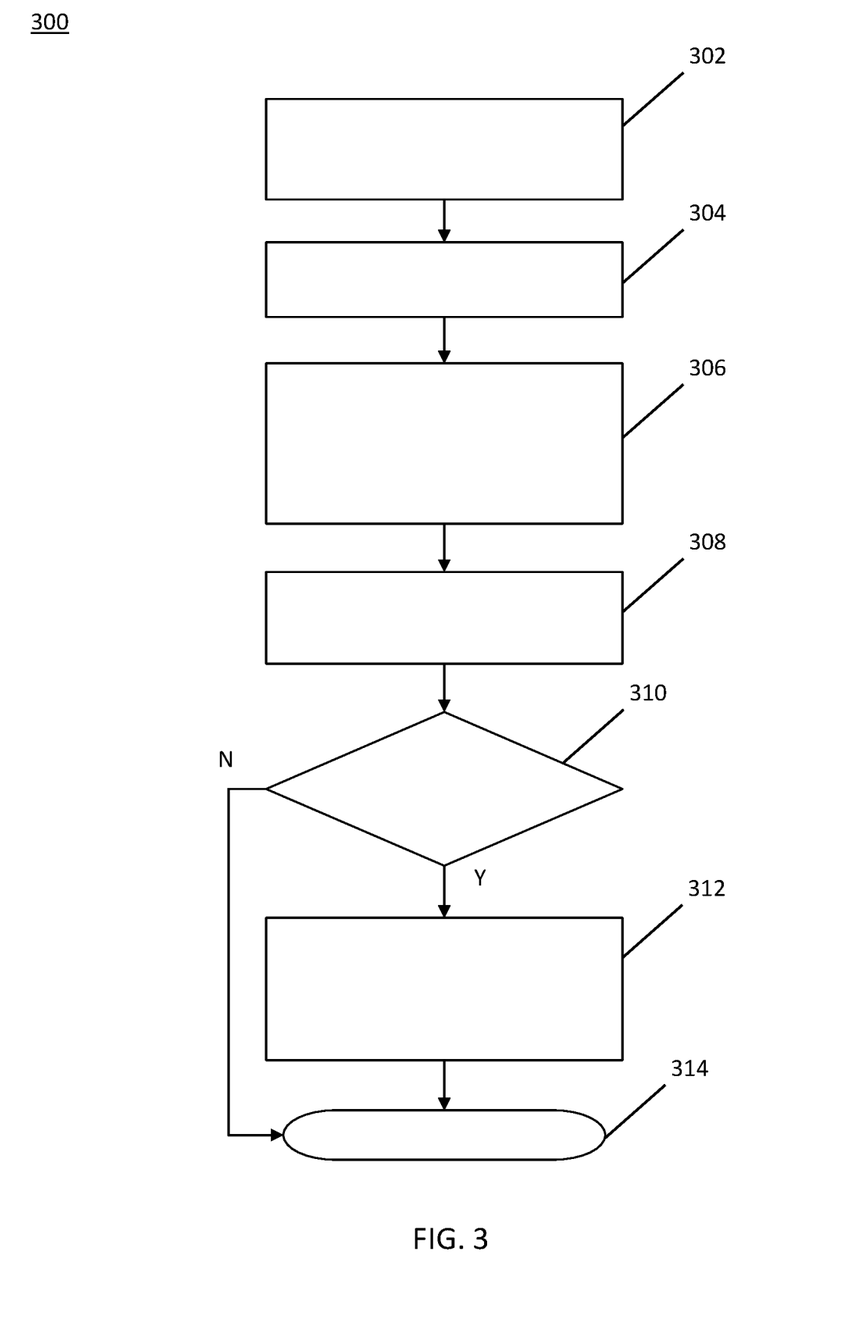
FIG. 3 depicts a flowchart of a method for smart paging for a traveling user equipment according to one or more examples.

FIG. 3 depicts a flowchart of a method for smart paging for traveling UE according to one or more examples. Method 300, depicted in FIG. 3, is initiated, in one or more examples, by the base station 102A upon receiving a paging message from the core network 106. The paging message is to be sent to a UE 104A in the RRC_INACTIVE state, at block 302.

The base station 102A, in response, checks the behavior of the UE 104A to predict a location of the UE 104A, and consequently a predicted RNA of the UE 104A, at block 304. Checking the behavior includes analyzing the route and velocity information matrix (Table 2) associated with the UE 104A. As noted herein, using the time-lapse information, the location information, and direction/heading information from the route and velocity information matrix, the base station 102A predicts an estimated location for the UE 104A, at block 306. Say that the estimated location of the UE 104A is in the RNA 110B that is serviced by the base station 102B.

The base station 102A forwards the paging message for the UE 104A to the base station 102B, which is based on the predicted RNA 110B of the UE 104A, at block 308. At block 310, the base station 102B waits for a predetermined duration (e.g., R seconds) for the UE 104A to respond to the paging message. If the response from the UE 104A is received, the prediction is deemed accurate, and method 300 completes at block 314. In one or more examples, the UE context for the UE 104A can be removed from the base station 102A considering that the UE 104A is now in another RNA (e.g., 110B).

Alternatively, suppose a response from the UE 104A is not received within the predetermined duration. In that case, the base station 102A sends a paging request to other base stations 102 based on the route information, at block 312. For example, the other base stations 102 that receive the paging requests are the neighboring base stations 102 of the base station 102B of the predicted RNA 102B. Alternatively, or in addition, the base station 102A sends the paging request to the base stations 102 of the selected list of RNAs 110 (block 206; FIG. 2). In yet another example, base station 102A sends the paging request to the base stations 102 of the selected list of RNAs 110 and the neighboring base stations 102 of each of the base stations 102 from the list. Each of the additional base station 102 that receives the paging request from the base station 102A forwards the paging message to all of the UEs 104 in its respective RNA 110. When the UE 104A receives the paging message and responds to it, the forwarding of the paging message stops, at block 314.

In one or more examples, at block 312, the base station 102A sends the paging requests to the additional base stations 102 in a sequential manner. In the sequential paging forwarding, the base station 102A sends the paging request to a first base station, say base station 102C, and waits for the predetermined duration of R seconds for a response from the UE 104A. If a response is not received, the base station 102A forwards the paging request to a second base station, for example, base station 102D, and so on. The order of the sequential forwarding to the additional base stations can be determined in several ways. For example, the base stations along the predicted route 150 can be contacted in order of predicted arrival time of the UE 104A (i.e., the base station at time t1 is contacted first, the base station at time t2 next, and so on). In other cases, base station 102A sends the paging requests to the first base station, followed by its neighboring stations, and then to the second base station, followed by its neighboring stations, and so on. Other examples are possible.

In other examples, at block 312, the base station 102A sends the paging request to the additional base stations 102 in a parallel manner. In the parallel paging forwarding, the base station 102A sends the paging request to all of the additional base stations 102 substantially concurrently. The base station 102A then waits for the predetermined R seconds for a response from the UE 104A. If a response is received, the forwarding is stopped, at block 314.

In either case, sequential or parallel, if a response is not received from the additional base stations 102, the base station 102A may identify even more additional base stations 102 and repeat the above operations. Alternatively, the UE 104A may be deemed out of service, for example, after a predetermined duration since the RRC_INACTIVE state or after a predetermined number of paging requests.

Figure 4:
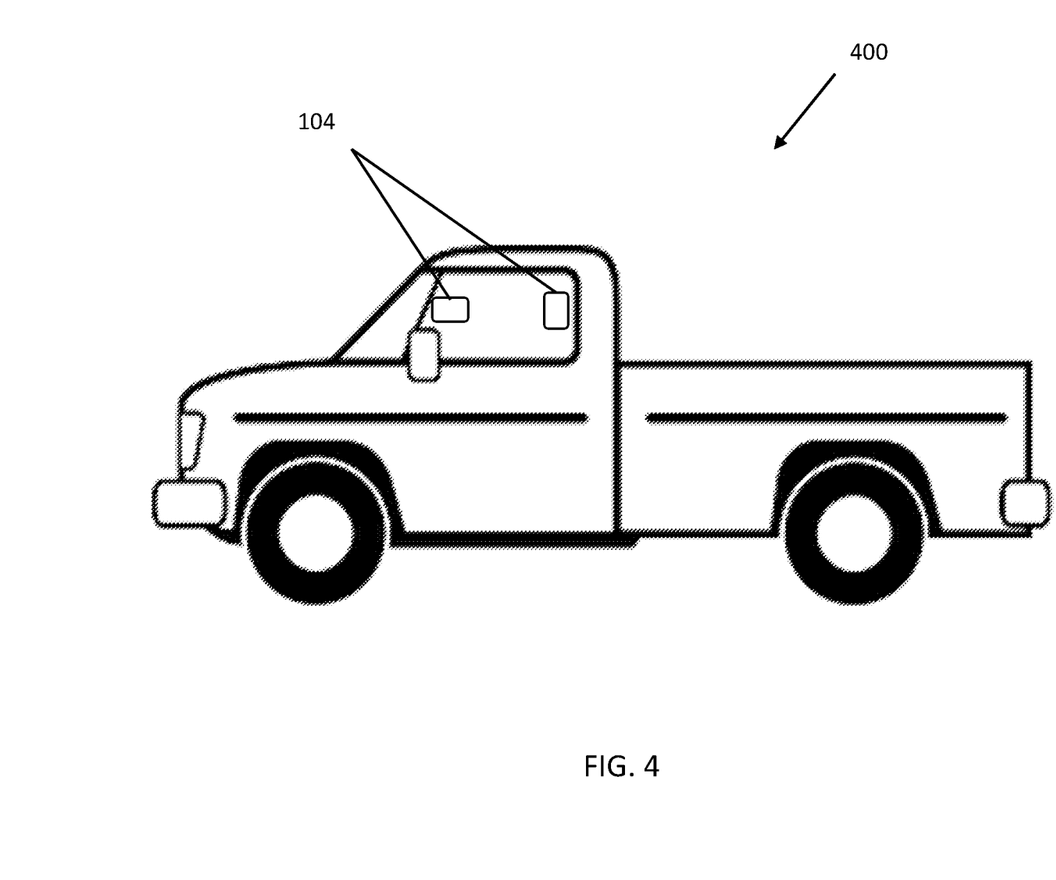
FIG. 4 depicts a vehicle that includes one or more user equipment.

FIG. 4 depicts a vehicle 400 that includes one or more UEs 104. The UE 104 can be embedded in the vehicle 400, for example, as part of a vehicle controller, infotainment system, roadside assistance system, etc. Alternatively, or in addition, the UE 104 can be a phone, a GPS device, a wearable device, a tablet computer, a laptop computer, or any other such communication device inside the vehicle 400. It is understood that the vehicle 400 that is depicted is just an example and that other examples can have other types of vehicles. Also, the positions of the UEs 104 in relation to the vehicle 400 can vary from the depiction in FIG. 4 in other examples.

Figure 5:
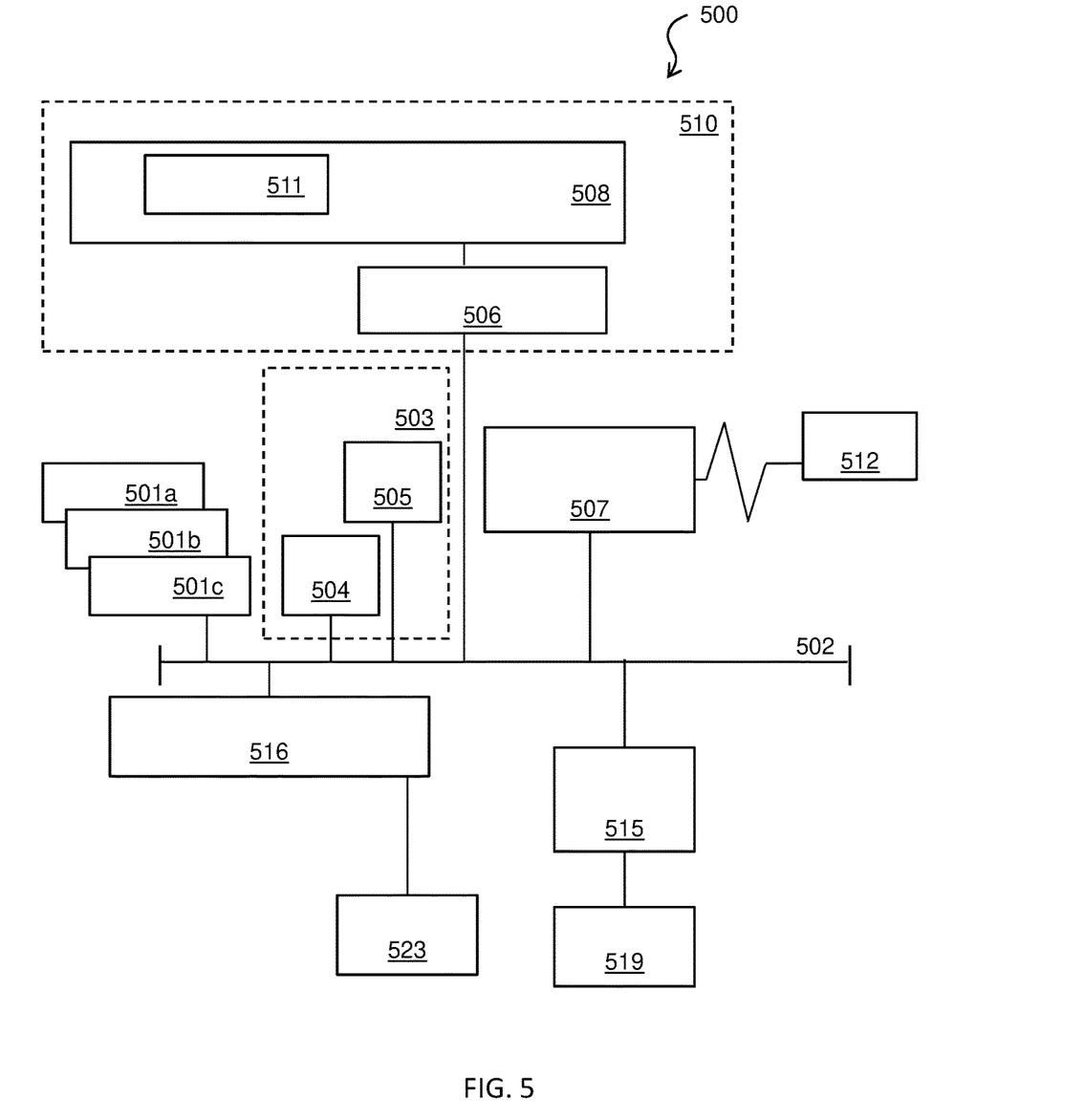
FIG. 5 depicts a computer system according to an example.

Turning now to FIG. 5, a computer system 500 is generally shown in accordance with an example. The computer system 500 can be used for implementing the base stations 102, the UE 104, the core network 106, and/or any other component of the wireless communication network 100. The computer system 500 can be an electronic computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 5, the computer system 500 has one or more central processing units (CPU(s)) 501*a*, 501*b*, 501*c*, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to system memory 503 and various other components. The system memory 503 can include a read-only memory (ROM) 504 and random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read-only memory, flash memory, or any other suitable memory system.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system to coordinate the functions of the various components shown.

Additional input/output devices are shown as connected to the system bus 502 via a display adapter 515 and an interface adapter 516. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by the display adapter 515, which may include a graphics controller to improve the performance of graphics-intensive applications and a video controller. A keyboard, a mouse, a touchscreen, one or more buttons, a speaker, etc., can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and storage capability including the system memory 503 and the mass storage 510, input means such as the buttons, touchscreen, and output capability including a speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through network 512. In some examples, an external computing device may be an external web server or a cloud computing node.

It is to be understood that the block diagram of FIG. 5 is not intended to indicate that the computer system 500 is to include all of the components shown. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

Technical solutions described herein accordingly facilitate techniques for RRC_INACTIVE state message to contain information about a traveling UE, such as velocity vector, coordinate (latitude/longitude) information, and other mobility information. The technical solutions described herein further facilitate techniques to select RNAs for the traveling UE based on the information contained in the RRC_INACTIVE state message. The technical solutions described herein accordingly facilitate the UE to send a route-based matrix to a base station. Further, the technical solutions described herein facilitate smart paging based on route-based matrix information. The UE can be a vehicle in some cases. Alternatively, or in addition, the UE can be embedded in the vehicle. In yet other examples, the UE can be inside the vehicle, which is traveling.

The technical solutions described herein provide improvements to electronic wireless communication networks. The technical solutions described herein improve device power saving. The technical solutions described herein provide an efficient network congestion control that leads to better performance of the wireless communication network. The technical solutions described herein reduce UE paging, particularly vehicular paging, by at least 50%. Such optimization provides a significant reduction in signaling load at the base stations. The technical solutions described herein further improve latency by creating targeted RNAs for moving/traveling UEs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope of the application.

What is claimed is:

1. A system comprising:
a user equipment (UE) that is traveling at least at a predetermined velocity, wherein the UE is in RRC_INACTIVE state since time T; and
a plurality of base stations comprising at least a first base station and a second base station, wherein:
the first base station receives an RRC_INACTIVE state message from the UE, wherein the RRC_INACTIVE state message comprises a location of the UE, a velocity of the UE, and a time-lapse, which is an elapsed duration since T; and
in response to a paging message from a core network, the first base station:
predicts a location of the UE;
in response to the UE being within range of the first base station, sends the paging message to the UE; and
in response to the UE being within range of the second base station, sends a request to the second base station to send the paging message to the UE.

2. The system of claim 1, wherein in response to the first base station receiving a message from the UE within a predetermined duration from sending the paging message, the first base station stores updated information of the UE based on the location, the velocity, and the time-lapse from the UE.

3. The system of claim 1, wherein the first base station stores the location, the velocity, and the time-lapse from the UE until the UE changes state from the RRC_INACTIVE state.

4. The system of claim 1, wherein the first base station further:
predicts a route of the UE based on a plurality of RRC_INACTIVE state messages from the UE;
determines a list of base stations along the route that is predicted; and
sends at least a subset of the list of base stations to the UE.

5. The system of claim 2, wherein in response to the first base station not receiving the message from the UE within the predetermined duration from sending the paging message, the first base station:
predicts a route of the UE based on a plurality of RRC_INACTIVE state messages from the UE;
determines a list of base stations along the route that is predicted; and
sends, to each base station from the list of base stations, the request to send the paging message to the UE.

6. The system of claim 5, wherein the first base station sends the request to each base station from the list of base stations sequentially.

7. The system of claim 5, wherein the first base station sends the request to each base station from the list of base stations concurrently.

8. A computer-implemented method comprising:
receiving, by a first base station from a plurality of base stations in a wireless communication network, an RRC_INACTIVE state message from a user equipment (UE) that is traveling at least at a predetermined velocity, wherein the UE is in RRC_INACTIVE state since time T, and wherein the RRC_INACTIVE state message comprises a location of the UE, a velocity of the UE, and a time-lapse, which is an elapsed duration since T; and
in response to receiving, by the first base station, a paging message from a core network:
predicting, by the first base station, a location of the UE;
in response to the UE being within range of the first base station, sending, by the first base station, the paging message to the UE; and
in response to the UE being within range of a second base station from the plurality of base stations, sending, by the first base station, a request to the second base station to send the paging message to the UE.

9. The computer-implemented method of claim 8, wherein in response to the first base station receiving a message from the UE within a predetermined duration from sending the paging message, the first base station stores updated information of the UE based on the location, the velocity, and the time-lapse from the UE.

10. The computer-implemented method of claim 8, wherein the first base station stores the location, the velocity, and the time-lapse from the UE until the UE changes state from the RRC_INACTIVE state.

11. The computer-implemented method of claim 8, wherein the first base station further:
predicts a route of the UE based on a plurality of RRC_INACTIVE state messages from the UE;
determines a list of base stations along the route that is predicted; and
sends at least a subset of the list of base stations to the UE.

12. The computer-implemented method of claim 9, wherein in response to the first base station not receiving the message from the UE within the predetermined duration from sending the paging message, the first base station:
predicts a route of the UE based on a plurality of RRC_INACTIVE state messages from the UE;
determines a list of base stations along the route that is predicted; and
sends, to each base station from the list of base stations, the request to send the paging message to the UE.

13. The computer-implemented method of claim 12, wherein the first base station sends the request to each base station from the list of base stations sequentially.

14. The computer-implemented method of claim 12, wherein the first base station sends the request to each base station from the list of base stations concurrently.

15. A vehicle comprising:
a user equipment (UE) that is traveling at least at a predetermined velocity, wherein the UE is in RRC_INACTIVE state since time T;
the UE is configured to:
send, to a first base station from a plurality of base stations, an RRC_INACTIVE state message, wherein the RRC_INACTIVE state message comprises a location of the UE, a velocity of the UE, and a time-lapse, which is an elapsed duration since T; and
receive, from the first base station, a list of base stations, wherein the first base station predicts a route of the UE based on a plurality of RRC_INACTIVE state messages from the UE, and determines the list of base stations along the route that is predicted.

16. The vehicle of claim 15, wherein the UE is embedded in a vehicle controller of the vehicle.

17. The vehicle of claim 15, wherein the UE is an independent device from the vehicle, and wherein the UE is being used inside the vehicle.

18. The vehicle of claim 15, wherein the UE sends, to the first base station, an updated location or an updated velocity in response to a detected change.

19. The vehicle of claim 15, wherein the UE sends, to the first base station, a route and velocity information matrix that comprises a plurality of entries, each entry comprising the location of the UE, the velocity of the UE, and the time-lapse since T.

20. The vehicle of claim 15, wherein, at time T+X seconds, the UE sends the RRC_INACTIVE state message to a second base station based on the list of base stations indicating that the UE will be in range of the second base station at the time T+X seconds.

* * * * *